US005641008A

United States Patent [19]
Ellis

[11] Patent Number: 5,641,008
[45] Date of Patent: Jun. 24, 1997

[54] POTTING MACHINE

[76] Inventor: C. Mitchell Ellis, 7461 Lott Rd., Wilmer, Ala. 36587

[21] Appl. No.: 396,224

[22] Filed: Feb. 28, 1995

[51] Int. Cl.$^6$ .................. B67C 3/00; B65B 43/42
[52] U.S. Cl. .................. 141/129; 141/177; 141/231; 47/901; 198/576; 198/832.1
[58] Field of Search .................. 141/129, 156–160, 141/231, 232, 233, 177; 47/901; 198/576, 832.1

[56] References Cited

U.S. PATENT DOCUMENTS

| | | | |
|---|---|---|---|
| 2,884,022 | 8/1959 | Geary | 47/901 |
| 2,920,503 | 1/1960 | Burrows | 198/576 |
| 3,657,839 | 4/1972 | Krause | 47/901 |
| 3,713,465 | 1/1973 | Van Nobelen | 47/901 |
| 3,726,041 | 4/1973 | Ota et al. | 47/901 |
| 3,782,033 | 1/1974 | Hickerson | 47/901 |
| 4,020,881 | 5/1977 | Nothen | 47/901 |
| 4,363,341 | 12/1982 | Powell | 141/78 |
| 4,697,623 | 10/1987 | Bouldin et al. | 141/80 |
| 5,356,129 | 10/1994 | Godlewski | 271/212 |

Primary Examiner—Henry J. Recla
Assistant Examiner—Timothy L. Maust
Attorney, Agent, or Firm—Nixon & Vanderhye PC

[57] ABSTRACT

A plant potting machine includes a pot track for sequentially conveying plant pots along a potting path. A soil lift conveyor having a soil discharge chute lifting soil above the pot track and discharges the soil through the soil discharge chute and into those plant pots on the pot track positioned in the potting path therebelow, while a soil infeed conveyor conveys the soil from a source thereof to the soil lift conveyor. The soil flow rate between the infeed and lift conveyors is synchronized by a chain-and-sprocket synchronizer. Thus, a soil flow-control motor connected to the chain-and-sprocket synchronizer continuously drives the same so that the soil infeed and lift conveyors respectively feed and lift soil in a continuous synchronous manner to thereby effect control over the flow of soil from the soil source to the discharge chute. The potting machine preferably has coordinated indexing and soil drilling assemblies so as to respectively advance the plant pots along the potting path and drill a recess in the soil deposited into the plant pots by the lift conveyor. The speeds of the soil flow-control motor and a drill motor associated with the drilling assembly are most preferably variably controlled independently by logic programmable controllers (LCP's). The rate at which the pot track indexes and the drilling assembly reciprocates is most preferably controlled via a variable speed pulley system.

34 Claims, 5 Drawing Sheets

POTTING MACHINE

FIELD OF INVENTION

This invention relates to machines which assist in plant potting operations. In preferred embodiments, the present invention relates to potting machines having a pot track for carrying pots along a desired course, a soil infeed conveyor, and a soil lift conveyer.

BACKGROUND AND SUMMARY OF THE INVENTION

Horticultural growers have a need to periodically place growing plants (e.g., seedlings, shrubs, flowers, and the like) in pots of sufficient size so as to accommodate future growth. Once the potted plants have attained a desired size, therefore, they can be sold to retail nurseries, landscape companies or the like for transplanting to a permanent site.

Potting machines which assist the horticultural growers in placing their plants into soil-containing pots are well known. In this regard, most potting machines include a soil infeed conveyor which transfers potting soil from a soil supply to a soil lift conveyer which elevates the soil over and into pots travelling along a closed-loop pot track. Conventional potting machines, however, frequently experience difficulties in overfeeding/underfeeding soil to the lift conveyor since the speeds of the soil infeed and lift conveyors (and hence their respective soil flow rates) are independently set.

In this connection, jamming of the soil lift conveyor can sometimes occur in a soil overfeed situation since the lift conveyor is travelling downwardly at its pick-up region (i.e., the junction of the soil infeed conveyor and the soil lift conveyor). That is, since the soil lift conveyor is moving downwardly relative to the soil being delivered by the soil-infeed conveyor at their junction (and thus has to travel around the bottom-most conveyor sprocket and then upwardly to the discharge chute of the machine), there is a real possibility that the lift conveyor will jam in a soil overfeed situation due to soil being packed around the bottommost sprocket. When such a jam occurs, the potting activities associated with the machine must be suspended while the packed soil is removed thereby leading to unproductive time.

What has been needed, therefore, is a potting machine which reduces (if not eliminates entirely) at least some of the disadvantages of conventional potting machines. It is towards fulfilling such a need that the present invention is directed.

Generally, the present invention is embodied in a potting machine whereby the soil infeed and lift conveyors are operated continuously, but are synchronized so as to achieve a proper soil flow rate. In addition (or alternatively), the soil lift conveyor of this invention moves upwardly at the juncture with the soil infeed conveyor. As a result, soil is substantially prevented from being transferred rearwardly into the lift conveyor housing where it could jam the lift conveyor's lower sprocket. Furthermore, since the soil being lifted by the lift conveyor is emptied into the discharge chute of the machine at the apex of the lift conveyor's run, any soil which may become dislodged from the individual lift conveyor slats falls by gravity to the juncture of the lift conveyor and the soil infeed conveyor where it again is presented to the lift conveyor slats.

The lift conveyor and the soil infeed conveyor are most preferably synchronized by means of a chain-and-sprocket synchronizer assembly. Thus, according to the present invention, a single electric motor, preferably under control by a logic programmable controller (LPC), is coupled operatively to the drive shaft of the lift conveyor and the motive force provided by the lift conveyor drive shaft is transferred to the input shaft of the soil infeed conveyor via chain-and-sprocket synchronizer assembly. Auxiliary components, such as the indexing assembly for the pot track and a reciprocal drill (which serves to drill a recess in the soil deposited into the pots by the lift conveyor), are thus capable of being driven collectively by another LPC-controlled electric motor and synchronized independently to the speeds of the soil-infeed and lift conveyors.

Further aspects and advantages of this invention will become more clear after careful consideration is given to the detailed description of the preferred exemplary embodiments thereof which follows.

BRIEF DESCRIPTION OF THE DRAWINGS

Reference will hereinafter be made to the accompanying drawings wherein like reference numerals throughout the various FIGURES denote like structural elements, and wherein.

DETAILED DESCRIPTION OF THE PREFERRED EXEMPLARY EMBODIMENTS

Figure 1:
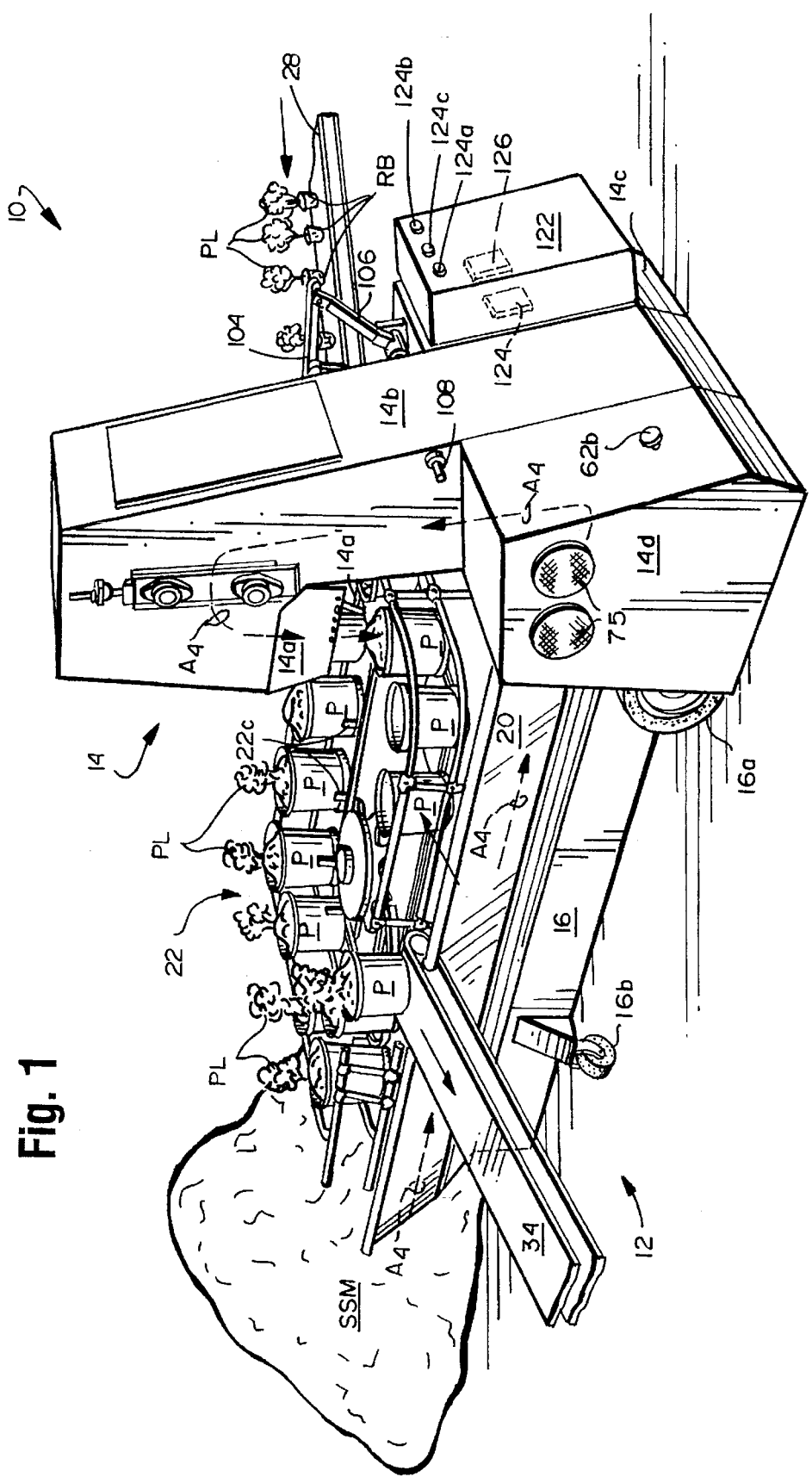
FIG. 1 is a perspective view of a particularly preferred embodiment of the potting machine according to this invention.

Accompanying FIGS. 1–4 depict a particularly preferred embodiment of the potting machine 10 according to the present invention in several views for ease of description and understanding. In this regard, as shown particularly in FIGS. 1 and 2, the potting machine 10 generally includes a forward potting section 12 and a rearward soil lift section 14.

The forward potting section includes a generally horizontal platform frame 16 which is supported for rolling movement over the ground's surface (e.g., so the machine 10 can be transported between different locations) by rear wheels 16a and journaled front wheels 16b. The frame 16 supports the soil-infeed conveyor belt 18 by means of a forward idler sprocket and shaft 18a, 18b, respectively, and a rearward input sprocket and shaft 18c, 18d, respectively (see FIG. 2). The tension of the soil infeed conveyor belt 18 may be adjusted by the linearly movable tension adjustment assembly 18e which carries the forward idler sprocket and shaft 18a and 18b, respectively. A pair of opposed side walls 20 extend upwardly and outwardly from the frame 16 so as to direct any soil back to the soil-infeed conveyor belt 18. Potting soil from a soil supply mound SSM may thus be transferred by the soil-infeed conveyor belt 18 to the soil lift section 14.

Figure 2:
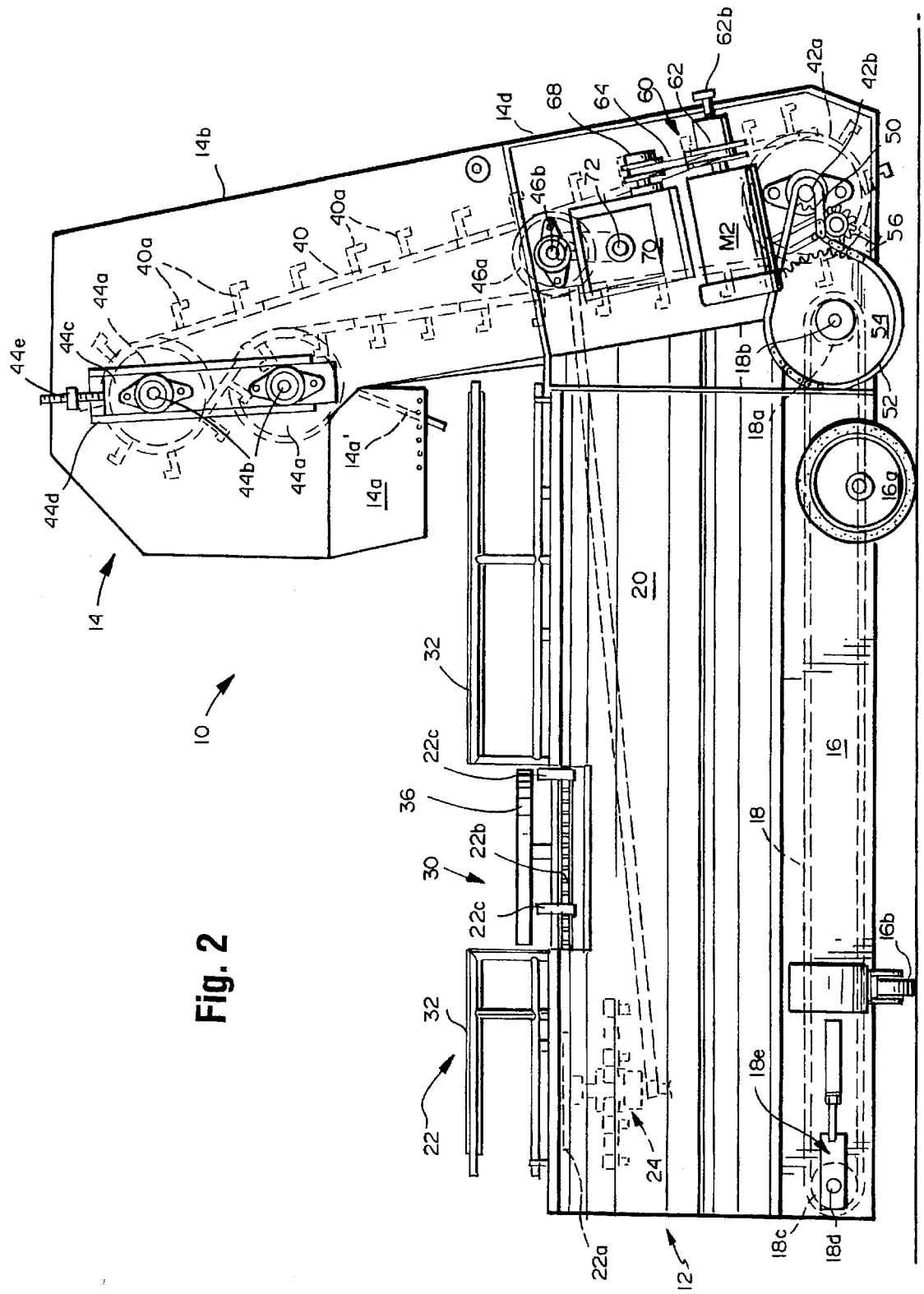
FIG. 2 is a full right side elevational view of the potting machine shown in FIG. 1.

The frame 16 also supports a pot track 22 which is comprised of a number of sprockets (one of which is shown in FIG. 2 and identified by reference numeral 22a) engaged with a pot track chain 22b to define a closed-loop track around which the pots P travel in a counterclockwise direction as viewed from above FIG. 1. In this regard, the pots P are supported by spaced-apart pot holders 22c connected to the pot track chain 22b. An indexing assembly 24 (to be described in further detail below) sequentially moves the pots P around the pot track through the various potting stations.

Thus, empty pots P placed into the pot holders 22c upstream of the soil lift section 14 will be indexed sequentially below the soil discharge chute 14a so that soil may be deposited therein. The discharge chute 14a most preferably has an angularly adjustable hinged rear wall 14a' so as to allow size adjustment of the chute to accommodate pots P of various diameters. After being filled with soil from the soil discharge chute 14a, the pots P are then indexed into registry with the soil drilling station 26 (see FIGS. 3 and 4) where a recess of sufficient size to accommodate the root ball RB of plants PL being delivered to the machine 10 via conveyor 28 is drilled physically into the soil deposited in the pot P. The root balls RB of the plants PL may then manually be placed into the recess and covered with some additional potting soil. The potted plants are then sequentially advanced to the discharge opening 30 in the guard rails 32 where they are directed onto an off-loading conveyor 34 (see FIG. 1) via a fixed discharge cam 36 positioned in the conveyance path of the pots P along the pot track section 12.

The soil lift section 14 is generally comprised of a continuous lift conveyor 40 carrying a number of soil-lifting slats (a few of which are identified in FIGS. 2 and 3 by reference numeral 40a) contained within a soil lift housing 14b. The lift conveyor 40 is routed around a lower drive sprocket 42a mounted to the housing 14b via journalled shaft 42b so that its ascending section is positioned adjacent the forward end of the soil infeed conveyor belt 18. At the upper end of its travel, the lift conveyor 40 is routed around a pair of parallel mounted discharge sprockets 44a mounted to the housing via journalled shafts 44b. As shown particularly in FIG. 2, the journalled shafts 44b are mounted in a common plane which is canted toward the rearward end of the machine 10 (i.e., in a direction toward the pot track 22). As such, the soil will be discharged from the slats 40a as it travels over the lower sprocket 44a and into the discharge chute 14a.

Figure 4:
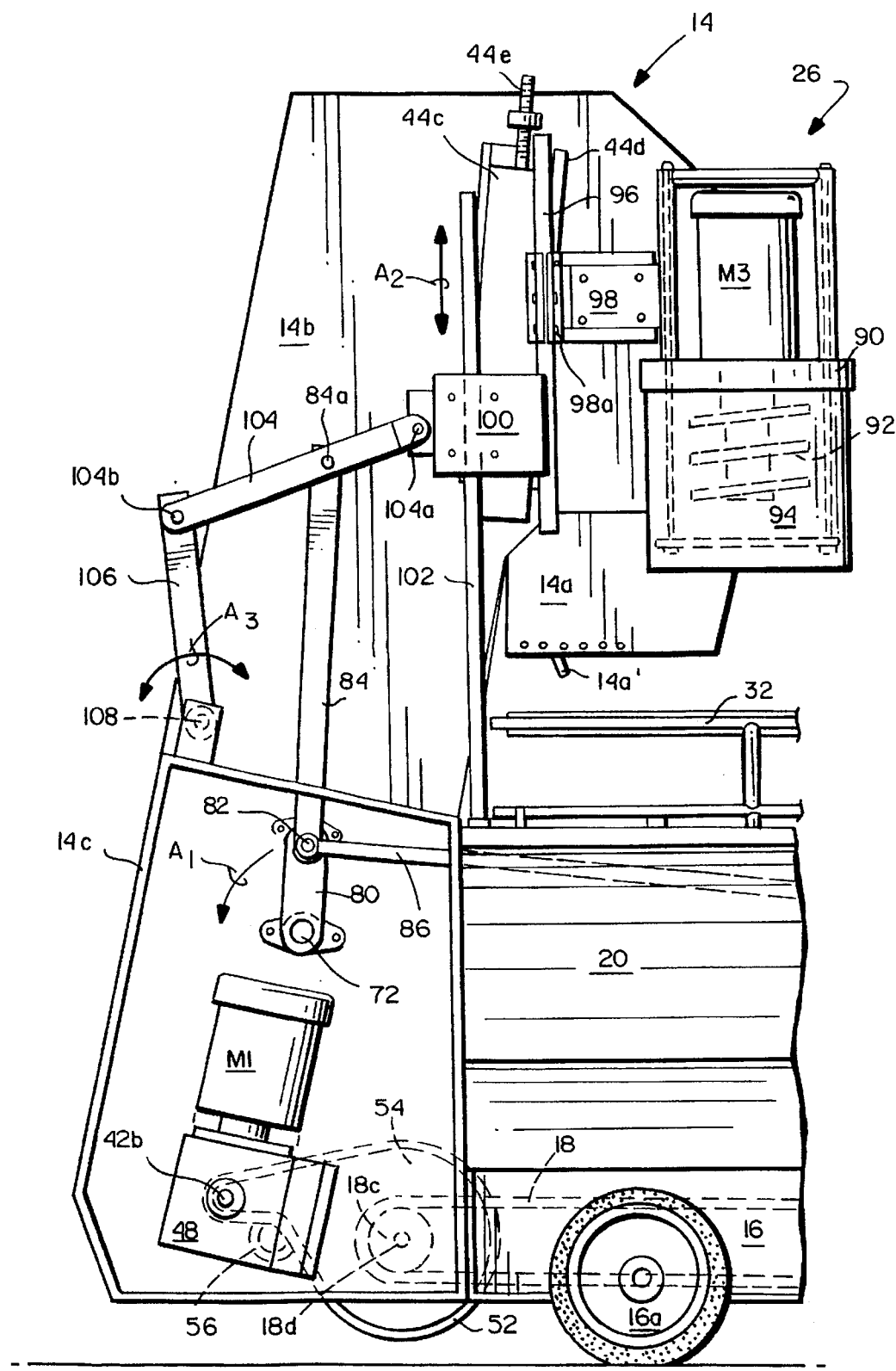
FIG. 4 is a partial left side elevational view of the rear portion of the potting machine shown in FIG. 1.

Each end of the journaled shafts 44b is mounted to a respective adjustment plate 44c slidably mounted in a guideway 44d (see also FIG. 4). Thus, the tension of the lift conveyor 40 may be adjusted by moving the adjustment plate 44c (and hence the sprockets 44b) via adjustment screw 44e. An intermediate sprocket and journalled shaft 46a, 46b, respectively, are provided between sprocket and shafts 44a, 44b and 42a, 42b, so as to maintain separation of the lift conveyor 40 as it travels its defined course (i.e., in the clockwise direction as viewed in FIG. 2).

The journalled shaft 42b is operatively coupled to a gearbox assembly 48 contained within the left equipment cabinet 14c as shown in FIG. 4. The equipment cabinet 14c also houses an electric motor M1, the output of which is connected directly to the gearbox 48. Thus, upon operation of the electric motor M1, the journalled shaft 42b will be turned in a counterclockwise direction as viewed in FIG. 4 (a clockwise direction as viewed in FIG. 2) so as to cause the ascending section of the lift conveyor 40 to move upwardly relative to the forward end of the soil infeed conveyor belt 18. The other end of the journalled shaft 42b is housed within the right equipment cabinet 14d as shown in FIG. 2 and carries a drive sprocket 50. The drive sprocket 50 is coupled operatively via drive chain 52 to a larger-diameter sprocket 54 attached to an end of the shaft 18d of the soil infeed conveyor 18. A journalled idler sprocket 56 is intermeshed with the drive chain 52 so as to allow tension adjustment thereof.

The mechanically chain-coupled sprockets 50 and 52 thus cause the lift and soil infeed conveyors 40 and 18 to operate continuously and simultaneously upon operation of the electric motor M1. In addition, the gear reduction provided by the sprockets 50 and 52 synchronizes the infeed of soil via conveyor 18 to the lifting of soil via the lift conveyor 40. Because of such synchronization and the ability to control simultaneously the relative speeds of both conveyors 18 and 40 via the electric motor M1, the possibility of soil binding the lift conveyor 40 at the juncture between the conveyors 18 and 40 is significantly minimized. The ratio of the lift conveyor drive sprocket 50 to the soil infeed conveyor drive sprocket 54 is preferably between about 5:1 to about 10:1, and more preferably about 7.5:1. In the embodiment of the potting machine depicted in the accompanying drawings, the preferred sprocket ratio has been determined to be about 7.4:1.

The flow of potting soil being supplied by the lift conveyor 40 and the reciprocation cycle of the drill section 26 must be coordinated with the sequential conveyance of pots P along the pot track 22 so as to allow the potting machine 10 to accommodate pots P of different volumetric capacity. In this regard, for a given soil flow (i.e., as determined by the speed of motor M1), pots of smaller capacity (e.g., one gallon) will need to be sequentially conveyed along the pot track at a faster rate as compared to pots of larger capacity (e.g., five gallons).

Figure 3:
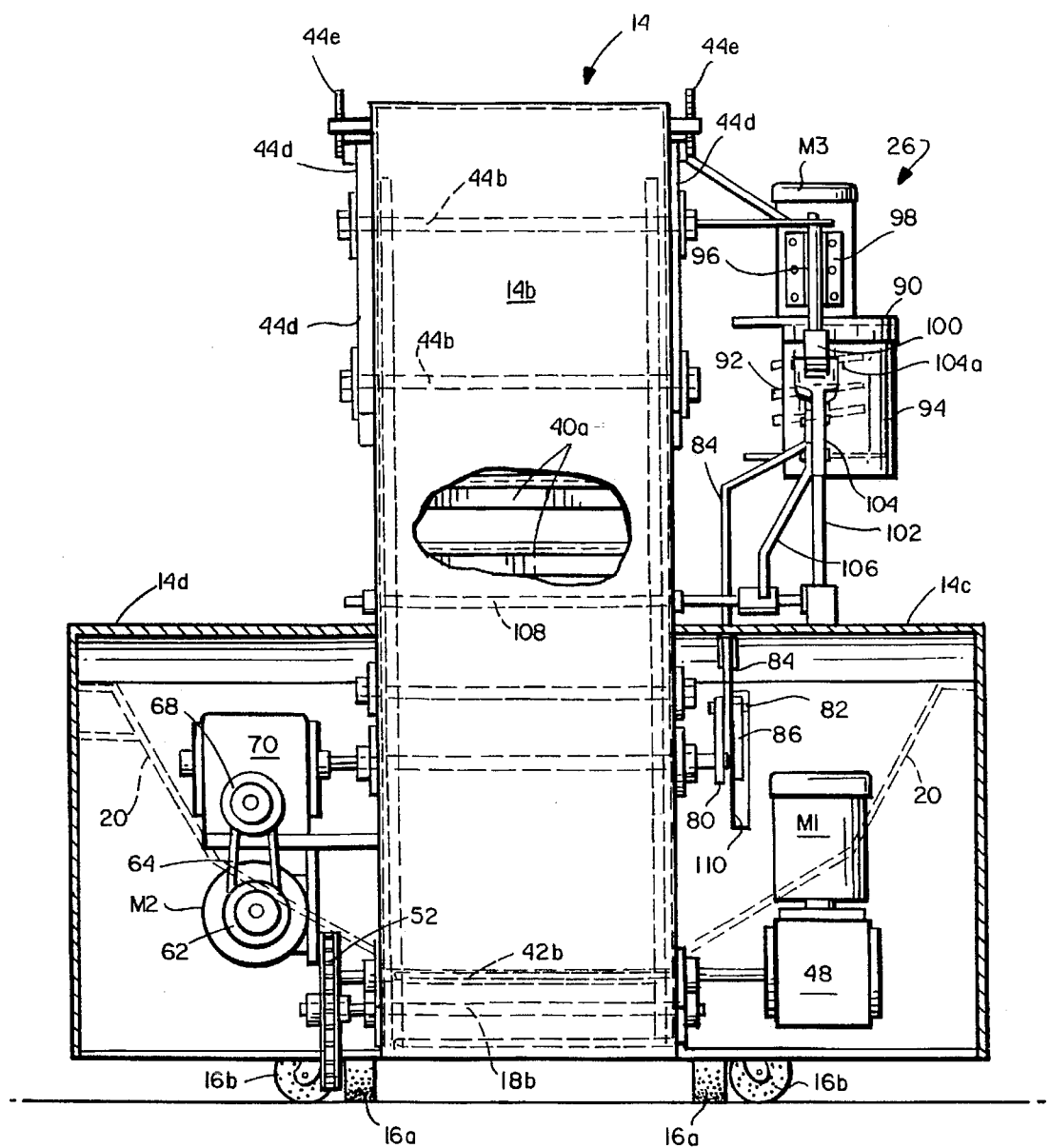
FIG. 3 is a rear elevational view of the potting machine shown in FIG. 1.

In order to provide such coordination, the potting machine 10 of the present invention utilizes an indexing rate adjustment system 60 comprised generally of a manually adjustable pulley 62 coupled to the output shaft of electric motor M2 and connected operatively by V-belt 64 to a driven sheave 68 (see FIGS. 2 and 3). The driven sheave 68 is coupled to the input shaft of the gearbox 70 which, in turn, is coupled to the journalled indexing drive shaft 72. A manually operated knob 62b is provided on the exterior of the right equipment cabinet 14d so that turning movement applied to the knob 62b will responsively turn the leadscrew associated with the adjustable pulley 62. Depending on the direction of turning movement applied to the knob 62b, therefore, the distance between the faces of the pulley 62 will either contract or expand thereby responsively forcing the V-belt 64 to a assume a greater or lesser diameter within the sheave 68 to thereby adjust the input speed to the gearbox 70 (and hence the rotation speed of the journalled shaft 72). Any suitable conventional variable speed pulleys may be employed in the system 60 according to the present invention. Presently preferred, however, are the MCV and TBR Series of variable speed pulleys commercially available from Hi-Lo Corporation of Minneapolis, Minn.

In order to allow venting of the equipment cabinets 14c, 14d to prevent excessive build-up of heat, vents 75 may be provided as shown in FIG. 1.

The end of the journalled indexing shaft 72 opposite the gear box 70 terminates within the left equipment cabinet 14c as shown in FIG. 4 and is connected to one end of a stub shaft 80. The opposite end of the stub shaft 80 is pivotally and coaxially connected at pivot pin 82 to the proximal ends of the drive arm 84 associated with the drilling section 26 and the indexing arm 86 associated with the indexing assembly 24. Thus, rotation of the shaft 72 in a counterclockwise direction as viewed in FIG. 4 will responsively rotate the stub shaft 80 which, in turn, causes the proximal ends of arms 84 and 86 to orbit concentrically in a counterclockwise direction (arrow $A_1$) about the axis of shaft 72.

The drilling section 26 includes a carriage frame 90 which carries the drill motor M3 and its associated drill bit 92. A shroud 94 is attached to the frame 90 and at least partially surrounds the bit 92 so as to prevent soil from being sprayed about the machine area when the drill bit 92 is retracted from a soil-filled pot P. The frame 92 is rigidly attached to adjustment rod 96 by means of bracket 98. The positioning of bracket 98 may however, be changed (e.g., so as to accommodate drill bits 92 of varying size) by loosening the bolts associated with the bracket clamp 98a and then repositioning the bracket 98 linearly along the adjustment rod 96.

The lower end of rod 96 is rigidly attached (e.g., via welding) to a slide bracket 100 which is coupled to guide rod 102 for vertical reciprocal movements (arrow $A_2$) thereabong. The distal end of drive arm 84 is pivotally coupled to an intermediate region of forward linkage arm 104 via pivot pin 84a. The forward linkage arm 104, on the other hand, is pivotally attached at one end to the slide bracket 100 via pivot pin 104a, and at its other end to an upper end of the rearward linkage arm 106 via pivot pin 104b. The lower end of the rearward linkage arm 106 is sleeved over a stationary shaft 108. As a result of such interconnections, the drive arm 84 will cause the rearward linkage arm 106 to oscillate coaxially about the shaft 108 (arrow $A_3$), which in turn causes the forward linkage arm to reciprocally displace the slide bracket 100 (and hence the drill bit 92) in the direction of arrow $A_2$.

Figure 5A:
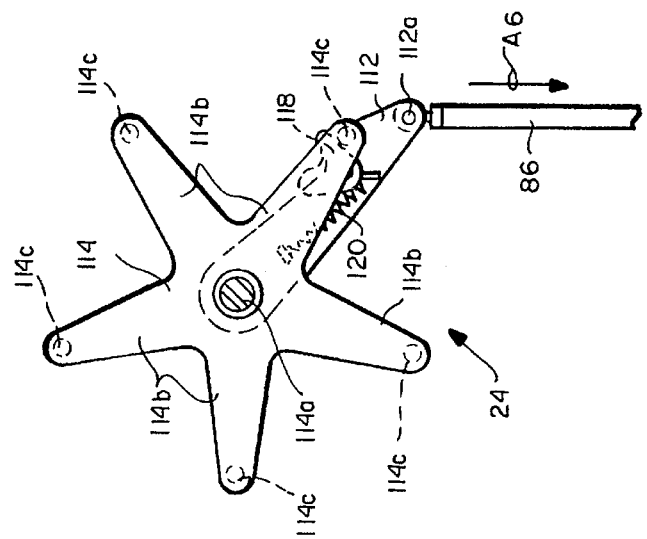
FIGS. 5A–5C are top plan views showing the sequence of operation of the indexing assembly according to the present invention.
Figure 5B:
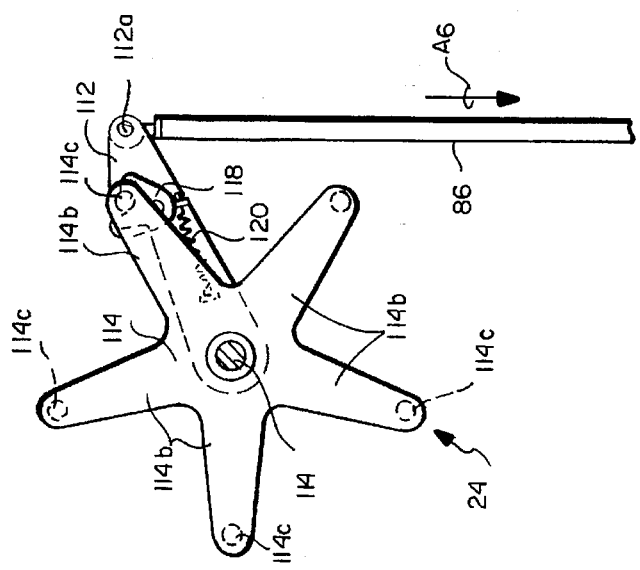
Figure 5C:
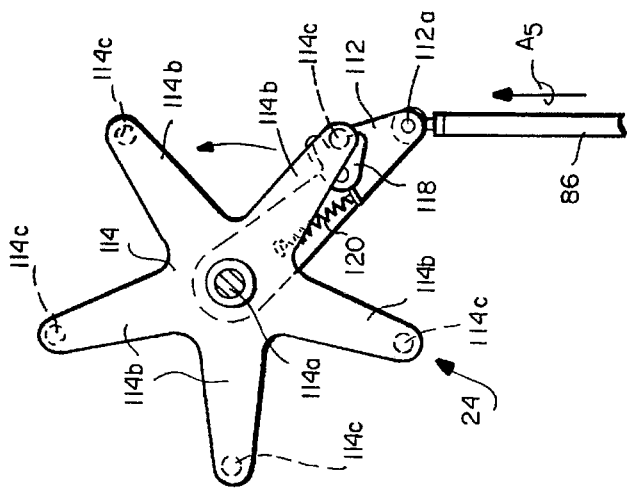

The indexing arm 86 extends through a vertical slot 110 in the left equipment cabinet 14c (see FIG. 3) to indexing assembly 24 located near the forward end of the potting machine 10. As shown in FIGS. 5A–5C, the terminal end of the indexing arm 86 is pivotally connected to the distal end of a support arm 112 via pivot pin 112a. The proximal end of the support arm 112, on the other hand, is pivotally and coaxially coupled to the axle 114a of spoked indexing wheel 114. Specifically, the proximal end of the support arm 112 and the indenting wheel 114 are mounted for independent rotation about a common vertical axis established by the axle 114a. The indenting wheel 114, however, is coupled rigidly to the sprocket 22a (see FIG. 1) so that rotation of the indexing wheel 114 will responsively drive the sprocket 22a (i.e., in a counterclockwise direction as viewed from above FIG. 1), and hence the chain 22b and its associated pot holders 22c.

The terminal ends of each spoke 114b of the indexing wheel 114 include a downwardly extending push pin 114c which coacts with a finger member 118 pivotally attached to the terminal end of the indexing shaft 86. A tension spring 120 normally biases the finger member 118 into a confronting position with the push pins 114c as shown in FIG. 5A. During a forward stroke of the indexing arm 84 (arrow $A_5$), the forward edge of the finger member 118 will contact one of the push pins 114b and thereby cause the indexing wheel 114 to rotate in a counterclockwise direction as shown in FIG. 5A until it reaches the end of its forward stroke as shown in FIG. 5B. At that time, the indexing arm 86 will then reverse direction (i.e., due to the rotation of stub shaft 80 as described previously) and be moved in a back stroke direction (arrow $A_6$).

Just prior to reaching the end of its back stroke, however, the rear edge of the finger member 118 will contact the next push pin 114c in sequence. This contact between the push pin 114c and the rear edge of the finger member 118 thereby causes the latter to pivot in a counterclockwise direction as shown in FIG. 5C against the bias force of the tension spring 120. In this manner, therefore, the finger member 118 will bypass the next push pin 114b in sequence during the back stroke of the indexing arm 86 to allow it to again assume the position shown in FIG. 5A, but with the next push pin 114c in sequence. At that time, the direction of the indexing arm 86 will again change so that it is being moved in a forward stroke (arrow $A_5$) to thereby again move the indexing wheel 114 and advance the pot track 22. The rate of this continual pot track advancement can be controlled by selectively manipulating knob 62b associated with the variable speed pulley system 60.

The overall operation of the potting machine 10 is controlled by means of the control unit 122 and the pot track control knob 62b. In the preferred embodiment of the potting machine 10, as shown in FIG. 1, the control unit 122 houses logic programmable controllers (LPC's) 124, 126 which receive input from manually adjustable speed control knobs 124a and 124b, respectively. The LPC's 124, 126 are, in and of themselves, conventional and are most preferably Micro5000 adjustable speed AC drive controllers commercially available from Furnas VeeArc Drives of Batavia, Ill. The LPC's 124, 126 are thus coupled operatively to motors M1 and M3, respectively so as to allow the machine operator to independently select and adjust for (1) the desired soil flow (represented by dashed arrows $A_4$ in FIG. 1) as determined by the synchronized speed of the soil-infeed conveyor 18 and lift conveyor 40, and (2) the optimum rotation speed of the bit 92 (e.g., so as to prevent soil spraying and/or inadequate soil drilling) depending upon the operating conditions (e.g., the volumetric capacities of the pots P and/or the condition/mix of the potting soil from the soil supply mound SSM).

The control unit 122 also includes an on-off switch 124c which activates the motor M2. Thus, when the motor M2 is activated, manipulation of the adjustment knob 62b associated with the variable speed pulley system 60 as described previously will allow the indexing rate of the pots travelling along the pot track 22 and the reciprocation rate of the drill station 26 to be fine-tuned to the soil flow rate for the particular operating conditions of the machine 10.

The potting machine 10 of the present invention therefore allows the machine operator to vary the performance parameters of the machine within extremely wide ranges so as to accommodate a variety of potting conditions. As a result, for a given potting condition, the productivity of the machine 10 can be maximized to its fullest potential.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A plant potting machine comprising:
   a pot track for sequentially conveying plant pots along a potting path;
   a soil lift conveyor having a soil discharge chute for lifting soil above the pot track and discharging soil through the soil discharge chute and into those plant pots on the pot track positioned in the potting path therebelow;
   a soil infeed conveyor for conveying soil from a source thereof to said soil lift conveyor;
   a synchronizer operatively interconnecting said soil lift conveyor and said soil infeed conveyor;

a soil flow-control motor connected to said synchronizer for continuously driving the same so that said soil infeed and lift conveyors respectively feed and lift soil in a continuous synchronous manner;

an indexing assembly operatively connected to said pot track for sequentially advancing said pot track and thereby responsively sequentially advancing the plant pots along the potting path;

a soil drilling assembly located along said potting path downstream of said soil lift conveyor and moveable reciprocally towards and away from said pot track for drilling a recess into soil deposited into the plant pots, said soil drilling assembly including,
(a) a reciprocally moveable drill carriage;
(b) a drill motor carried by said drill carriage;
(c) a drill bit connected to said motor so as to be rotated thereby and extending downwardly therefrom; and
(d) a motor drive unit operatively coupled to said drill carriage for reciprocally moving the same towards and away from said potting track, and wherein said plant potting machine further comprises a control system operatively connected to said soil flow-control motor and said drill motor to allow for independent speed control adjustment thereof.

2. A potting machine as in claim 1, wherein said synchronizer is a chain-and-sprocket synchronizer assembly.

3. A potting machine as in claim 1, further comprising a programmable controller operatively connected to said soil flow-control motor for operating said soil flow-control motor a variable speeds and thereby allow soil flow adjustment by adjusting the speed of said chain-and-sprocket synchronizer.

4. A potting machine as in claim 1, wherein said control system includes first and second programmable and independently operable controllers connected respectively to said soil flow-control motor and said drill motor.

5. A potting machine as in claim 2, wherein said chain-and-sprocket synchronizer includes:

infeed and lift conveyor sprockets respectively coupled to said soil infeed conveyor and said soil lift conveyor so as to drive the same and having a drive ratio of said infeed conveyor sprocket to said lift conveyor sprocket of between about 5:1 to about 10:1;

a drive shaft having one end connected as an output of said soil flow-control motor and another end connected to one of said first and second sprockets; and an endless drive chain intermeshed with said first and second sprockets.

6. A potting machine as in claim 5, wherein the drive ratio is about 7.5:1.

7. A potting machine as in claim 5, wherein the drive ratio is 7.4:1.

8. A plant potting machine comprising:

a pot track for sequentially conveying plant pots along a potting path;

a soil lift conveyor having a soil discharge chute for lifting soil above the pot track and discharging soil through the soil discharge chute and into those plant pots on the pot track positioned in the potting path therebelow;

a soil infeed conveyor for conveying soil from a source thereof to said soil lift conveyor;

a synchronizer operatively interconnecting said soil lift conveyor and said soil infeed conveyor;

a soil flow-control motor connected to said synchronizer for continuously driving the same so that said soil infeed and lift conveyors respectively feed and lift soil in a continuous synchronous manner;

an indexing assembly operatively connected to said pot track for sequentially advancing said pot track and thereby responsively sequentially advancing the plant pots along the potting path, wherein said indexing assembly includes a rate adjustment system to allow indexing rate adjustment of said indexing assembly to thereby adjust the rate at which the plant pots are sequentially advanced along the potting path, and wherein said rate adjustment system includes:
(i) a constant speed motor;
(ii) a gear box coupled operatively to said indexing assembly; and
(iii) a variable speed belt-and-pulley assembly operatively interconnecting said motor and gear box, said variable speed belt-and-pulley system being adjustable to responsively cause belt speed variance at the constant speed of said motor so that said belt speed variance is applied as an input to said gear box to thereby drive said indexing assembly at said belt speed variance.

9. A potting machine as in claim 8, further comprising a soil drilling assembly located along said potting path downstream of said oil lift conveyor and moveable reciprocally towards and away from said pot track for drilling a recess into soil deposited into the plant pots.

10. A potting machine as in claim 9, wherein said drilling assembly includes:

a reciprocally movable drill carriage;

a drill motor carried by said drill carriage;

a drill bit connected to said motor so as to be rotated thereby and extending downwardly therefrom;

a motor drive unit operatively coupled to said drill carriage for reciprocally moving the same towards and away from said potting track.

11. A potting machine as in claim 10, wherein said motor drive unit is operatively coupled to both said drill carriage and said indexing assembly so that said drill carriage reciprocally moves at a rate which is constant relative to the sequential advancement of the planting pots along said pot track achieved by said indexing assembly.

12. A potting machine as in claim 11, wherein motor drive unit includes a rate adjustment system to allow rate adjustment of both said indexing assembly and said drill carriage to thereby synchronously adjust the rate at which the plant pots are sequentially advanced along the potting path and soil deposited in said plant pots is drilled.

13. The potting machine as in claim 12, wherein said rate adjustment system includes:

a constant speed motor;

a gear box coupled operatively to said indexing assembly; and a variable speed belt-and-pulley assembly operatively interconnecting said motor and gear box, said variable speed belt-and-pulley system being adjustable to responsively cause belt speed variance at the constant speed of said motor so that said belt speed variance is applied as an input to said gear box to thereby drive both said indexing assembly and said drill carriage at said belt speed variance.

14. The potting machine as in claim 13, wherein said rate adjustment system includes:

a drive shaft connected at one end to said gear box and including a stub shaft at the other end thereof;

an indexing arm having one end pivotally coupled to said stub shaft and a terminal end coupled to said indexing assembly; and a drive arm having a distal end operatively coupled to said drill carriage and a proximal end pivotally connected to said stub shaft coaxially with said one end of said indexing arm.

15. The potting machine as in claim 14, wherein said indexing assembly includes:

a rotatable indexing wheel having a number of circumferentially spaced-apart push pins;

a pivotal support arm coaxially joined to said support arm so that said support arm pivots independently of rotation of said indexing wheel; and a finger member pivotally connected to said terminal end of said indexing arm so as to be movable between (i) an operative position wherein said finger member contacts one of said push pins during a forward stroke of said indexing arm so as to rotate said indexing wheel to sequentially advance said pot track, and (ii) an inoperative position wherein said finger member is pivotally deflected upon contact with said push pin during a back stroke of said indexing arm so as to prevent said finger member from rotating said indexing wheel.

16. A potting machine as in claim 15, wherein said indexing assembly includes a spring for biasing said finger member into said operative position.

17. A plant potting machine comprising:

a pot track which establishes a potting path;

a soil lift conveyor which discharges soil at a position above pots located on the pot track to thereby fill the pots with soil;

a soil infeed conveyor which conveys soil to the soil lift conveyor; and an indexing assembly operatively connected to said pot track for sequentially advancing said pot track and thereby responsively sequentially advancing the plant pots along the potting path: wherein said indexing assembly includes, (a) an indexing arm reciprocally movable in forward and back strokes;

(b) a rotatable indexing wheel having a number of circumferentially spaced-apart push pins;

(c) a pivotal support arm coaxially joined to said support arm so that said support arm pivots independently of rotation of said indexing wheel; and (d) a finger member pivotally connected to a terminal end of said indexing arm so as to be movable between (i) an operative position wherein said finger member contacts one of said push pins during said forward stroke of said indexing arm so as to rotate said indexing wheel to sequentially advance said pot track, and (ii) an inoperative position wherein said finger member is pivotally deflected upon contact with said push pin during said back stroke of said indexing arm so as to prevent said finger member from rotating said indexing wheel.

18. A potting machine as in claim 17, wherein said indexing assembly includes a spring for biasing said finger member into said operative position.

19. A plant potting machine comprising:

a pot track for sequentially conveying plant pots along a potting path;

a soil infeed conveyor;

a soil lift conveyor positioned at a forward end of said soil infeed conveyor to receive soil therefrom and having a soil discharge chute, wherein said soil lift conveyor includes an ascending section positioned adjacent said forward end of said soil infeed conveyor for lifting soil above the pot track and discharging soil through the soil discharge chute and into a plant pot on the pot track positioned in the potting path therebelow;

an AC electric soil flow-control motor having a driven output connected to at least one of said soil lift and infeed conveyors such that operation of said AC electric soil flow-control motor causes said soil infeed conveyor to convey soil to said forward end of said soil infeed conveyor and causes said ascending section of said soil lift conveyor to move upwardly relative to said adjacent forward end of said soil infeed conveyor; and a programmable adjustable speed AC drive controller operatively connected to said soil flow-control motor to allow selective adjustment of said driven output of said soil flow-control motor, wherein flow of soil from the source thereof may be controlled.

20. A potting machine as in claim 19, further comprising a synchronizer for operatively interconnecting said driven output of said motor to both of said soil lift conveyor and said soil infeed conveyor for operating both said soil infeed and lift conveyors continuously, but at respective operation speeds in dependence upon a single adjustment of said AC drive controller, such that the operation speed of said soil infeed conveyor is less than the operation speed of said soil lift conveyor.

21. A potting machine as in claim 19, further comprising:

a reciprocally moveable drill assembly having a drill bit, and an AC drill bit motor for rotating the drill bit; and a second programmable adjustable speed AC controller operatively connected to said drill motor so as to allow speed adjustment of said drill bit independently of said soil flow-control motor.

22. A potting machine as in claim 20, wherein said synchronizer is a chain-and-sprocket synchronizer.

23. A potting machine as in claim 20, wherein said motor is a constant speed AC electric motor.

24. A potting machine as in claim 20, further comprising an indexing assembly for sequentially indexing the planting pots along the potting path of the pot track.

25. A plant potting machine comprising:

a pot track which establishes a potting path;

a soil lift conveyor which discharges soil at a position above pots located on the pot track to thereby fill the pots with soil;

a soil infeed conveyor mechanically coupled to said soil lift conveyor which conveys soil to the soil lift conveyor;

a soil flow-control motor connected operatively to said soil lift and soil infeed conveyors; and a drilling assembly which includes, (a) a reciprocally moveable drill carriage;

(b) a drill motor carried by the drill carriage; and (c) a drill bit connected to the motor so as to be rotated thereby and extending downwardly therefrom; and a control system operatively connected to said soil flow-control motor and said drill motor to allow for independent speed control adjustment thereof.

26. A potting machine as in claim 25, wherein said control system includes first and second programmable and independently operable controllers connected respectively to said soil flow-control motor and said drill motor.

27. A potting machine as in claim 25, wherein said potting machine includes a chain-and-sprocket synchronizer assembly which mechanically couples said soil lift and infeed conveyors so that said soil flow-control motor simultaneously operates said soil lift and infeed conveyors.

28. A potting machine comprising:
   a pot track for sequentially conveying plant pots along a potting path;
   a soil infeed conveyor;
   a soil lift conveyor positioned at a forward end of said soil infeed conveyor to receive soil therefrom and having a soil discharge end vertically spaced above said pot track, wherein
   said soil lift conveyor includes an ascending section positioned adjacent said forward end of said soil infeed conveyor for lifting soil above the pot track and discharging soil at said discharge end thereof and into a plant pot on the pot track positioned in the potting path therebelow; and
   a soil flow-control motor having a driven output connected operatively to said soil lift conveyor to cause said ascending section of said soil lift conveyor to move upwardly relative to said adjacent forward end of said soil infeed conveyor.

29. A potting machine as in claim 28, wherein said soil lift conveyor includes upper and lower discharge sprockets at said soil discharge end, said soil lift conveyor being routed around said upper and lower discharge sprockets so that soil lifted thereby is discharged into said plant pot in response to said lift conveyor traveling around said lower discharge sprocket.

30. A potting machine as in claim 28, comprising a programmable adjustable speed AC drive controller operatively connected to said soil flow-control motor to allow selective adjustment of said driven output of said soil flow-control motor, wherein flow of soil from the source thereof may be controlled.

31. A potting machine as in claim 28, comprising a drilling assembly which includes:
   (a) a reciprocally moveable drill carriage;
   (b) a drill motor carried by the drill carriage; and
   (c) a drill bit connected to the motor so as to be rotated thereby and extending downwardly therefrom.

32. A potting machine as in claim 29, wherein said upper and lower discharge sprockets are mounted in a common plane which is canted toward the potting track.

33. A potting machine as in claim 31, comprising a programmable adjustable speed AC drive controller operatively connected to said drill motor to allow selective speed adjustment of said drill bit.

34. A potting machine as in claim 33, comprising a second programmable adjustable speed AC drive controller operatively connected to said soil flow-control motor to allow selective adjustment of said driven output of said soil flow-control motor independently of said drill motor.

* * * * *